United States Patent
Mehta et al.

(10) Patent No.: US 12,412,090 B2
(45) Date of Patent: Sep. 9, 2025

(54) METHOD AND APPARATUS FOR PROVIDING RECOMMENDATIONS FOR COMPLETION OF AN ENGINEERING PROJECT

(71) Applicant: Siemens Aktiengesellschaft, Munich (DE)

(72) Inventors: Akhil Mehta, Munich (DE); Marcel Hildebrandt, Munich (DE); Serghei Mogoreanu, Munich (DE); Swathi Shyam Sunder, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 736 days.

(21) Appl. No.: 17/637,234

(22) PCT Filed: Aug. 18, 2020

(86) PCT No.: PCT/EP2020/073059
§ 371 (c)(1),
(2) Date: Feb. 22, 2022

(87) PCT Pub. No.: WO2021/037603
PCT Pub. Date: Mar. 4, 2021

(65) Prior Publication Data
US 2022/0284286 A1    Sep. 8, 2022

(30) Foreign Application Priority Data

Aug. 29, 2019 (IN) .............................. 201941034781
Nov. 20, 2019 (EP) ...................................... 19210341

(51) Int. Cl.
*G06N 20/00* (2019.01)
*G06F 3/0482* (2013.01)
(Continued)

(52) U.S. Cl.
CPC ............. *G06N 3/08* (2013.01); *G06F 3/0482* (2013.01); *G06N 3/045* (2023.01); *G06N 20/00* (2019.01)

(58) Field of Classification Search
None
See application file for complete search history.

(56) References Cited

U.S. PATENT DOCUMENTS

2017/0116038 A1* 4/2017 Netto ............... G06Q 10/06311
2017/0323081 A1* 11/2017 Govro .................... G16H 10/60
(Continued)

FOREIGN PATENT DOCUMENTS

CN       109543112 A       3/2019

OTHER PUBLICATIONS

Hildebrandt Marcel et al: "A Recommender System for Complex Real-World Applications with Nonlinear Dependencies and Knowledge Graph Context", ROBOCUP 2008: ROBOCUP 2008: Robot Soccer Worldcup XII; [Lecture Notes in Computer Science; Lect. Notes Computer], Springer International Publishing, Cham, pp. 179-193, XP047514176; ISBN: 978-3-319-10403-4; [retrieved on May 25, 2019]; abstract; pp. 180, line 15-20; pp. 180, line 41-44; pp. 182, line 12-pp. 183, line 10; pp. 184, line 12-27; pp. 185, line 11-pp. 1; 2019.

(Continued)

*Primary Examiner* — Xuyang Xia
(74) *Attorney, Agent, or Firm* — Schmeiser, Olsen & Watts, LLP

(57) ABSTRACT

Provided is a recommendation engine to provide automatically recommendations for the completion of an engineering project, the recommendation engine including: a first artificial intelligence, AI, module adapted to provide latent representations of a sequence of selected items; and a second artificial intelligence, AI, module adapted to process the (Continued)

latent representations of the sequence of selected items provided by the first artificial intelligence, AI, module to generate at least one sequence of complementary items required to complement the sequence of selected items to provide a complete sequence of items output via an interface as a recommendation to complete the engineering project.

14 Claims, 3 Drawing Sheets

(51) Int. Cl.
    *G06N 3/045*      (2023.01)
    *G06N 3/08*      (2023.01)

(56) References Cited

U.S. PATENT DOCUMENTS

| | | | |
|---|---|---|---|
| 2018/0276542 A1 | 9/2018 | Cheng et al. | |
| 2019/0066016 A1* | 2/2019 | Ghosh | G06Q 10/0633 |
| 2019/0347621 A1* | 11/2019 | White | G06N 7/01 |
| 2019/0392345 A1* | 12/2019 | Adaska | G06N 5/04 |
| 2020/0401703 A1* | 12/2020 | Storms | G06F 21/577 |
| 2020/0410392 A1* | 12/2020 | Verma | G06N 3/044 |

OTHER PUBLICATIONS

Sun Zhu et al: "Research commentary on recommendations with side information: A survey and research directions"; in Electronic Commerce Research and Applications, Elsevier, Amsterdam, NL, vol. 37, Aug. 3, 2019 (Aug. 3, 2019), XP085846874, ISSN: 1567-4223, DOI: 10.1016/J.ELERAP.2019.100879 [retrieved on Aug. 3, 2019].

PCT International Search Report and Written Opinion of International Searching Authority mailed Nov. 30, 2020 corresponding to PCT International Application No. PCT/EP2020/073059 filed Aug. 18, 2020.

* cited by examiner

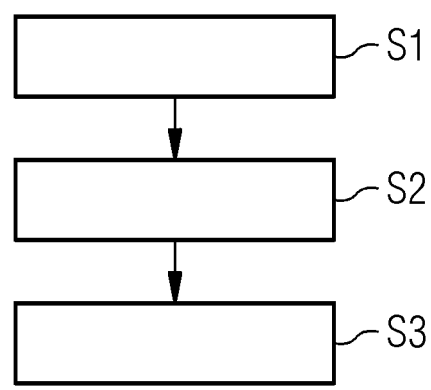

METHOD AND APPARATUS FOR PROVIDING RECOMMENDATIONS FOR COMPLETION OF AN ENGINEERING PROJECT

CROSS-REFERENCE TO RELATED APPLICATIONS

This application claims priority to PCT Application No. PCT/EP2020/073059, having a filing date of Aug. 18, 2020, which claims priority to EP Application No. 19210341.4, having a filing date of Nov. 20, 2019, and IN Application No. 201941034781, having a filing date of Aug. 29, 2019, the entire contents all of which are hereby incorporated by reference.

FIELD OF TECHNOLOGY

The following relates to a method and apparatus for automatically providing recommendations for the completion of a complex engineering project, in particular an automation system.

BACKGROUND

An engineering project such as an automated system can be complex and comprise a multitude of different components. The configuration of the complex engineering projects may comprise an iterative process, in which a user incrementally selects components. The combination of these selected components can fulfill functional requirements of the engineering projects while being also compatible with one another. The configuration of a complex engineering process is not an easy task and requires time, effort, experience, and a certain amount of domain-specific knowledge to be completed correctly by a user.

SUMMARY

An aspect relates to a method and apparatus automatically providing recommendations for the completion of an engineering project.

Embodiments of the invention provide according to the first aspect a recommendation engine to automatically provide recommendations for the completion of an engineering project, the recommendation engine comprising:
a first artificial intelligence module adapted to provide latent representations of a set of items and a second artificial intelligence module adapted to process the latent representations of the set of items provided by the first artificial intelligence module to generate at least one sequence of complementary items required to complement the set of items to provide a complete sequence of items output via an interface as a recommendation to complete the engineering project.

Providing recommendations for completing a partially configured engineering project reduces the time required to select components. Further, the process of selecting items associated with components of the engineering process can be performed by less experienced users with less domain-specific knowledge. The recommendation engine can be used for any kind of engineering project, in particular for different kinds of automated complex systems comprising a plurality of different components, i.e., hardware and/or software components.

In a possible embodiment of the recommendation engine according to the first aspect of the present invention, the items are selected from a set of available items corresponding to hardware and/or software components usable for the respective engineering project.

Each item can correspond to an associated hardware component such as a controller or to a software component such as an application program. Accordingly, the recommendation engine according to embodiments of the present invention can be used for a wide range of different engineering projects encompassing not only hardware components but also software components.

The information about the order of selected items in the sequence provides additional contextual information supporting the completion of the required items for the respective engineering project.

In a further possible embodiment of the recommendation engine according to the first aspect of the present invention, the set of selected items is stored at least temporarily in a memory connected to the recommendation engine. Consequently, loss of selected items can be avoided.

In a further possible embodiment of the recommendation engine according to the first aspect of the present invention, the first artificial intelligence module comprises a trained feature learning module adapted to calculate the latent representations of the set of items.

Latent representations calculated by the first artificial intelligence module can encode technical information about the components of the engineering project.

In a further possible embodiment of the recommendation engine according to the first aspect of the present invention, the second artificial intelligence module comprises a trained sequential model adapted to calculate at least one sequence of complementary items output as a recommendation to complete the engineering project.

The trained sequential model can exploit the temporal dependencies between items selected during engineering projects.

In a further possible embodiment of the recommendation engine according to the first aspect of the present invention, the items are selected by a user via a user interface having a screen adapted to output available items to the user. This facilitates the selection of available items.

In a further possible embodiment of the recommendation engine according to the first aspect of the present invention, one or more sequences of complementary items generated by the second artificial intelligence module are output on the screen of the user interface for selection of a next item from one of the sequences of complementary items or for selection of one or more items (not necessarily appearing one after the other) from one of the sequences of complementary items or for selection of a whole sequence of complementary items by the user.

This provides the advantage that the user has a choice whether to select a single next item or the whole sequence of complementary items for finalizing the selection at once. Accordingly, there is an automation mechanism for auto-completion of a partially configured engineering project.

In a further possible embodiment of the recommendation engine according to the first aspect of the present invention, the first artificial intelligence module and the second artificial intelligence module comprise artificial neural networks trained on technical features or properties of components and a plurality of sequences of previously selected items. The artificial intelligence modules can be trained on item features and historical click-stream data.

In a further possible embodiment of the recommendation engine according to the first aspect of the present invention, the first artificial intelligence module comprises a trained autoencoder.

In an alternative embodiment of the recommendation engine according to the first aspect of the present invention, the first artificial intelligence module comprises a tensor factorization model. Other artificial intelligence modules can be used comprising models capable of generating latent representations of items.

In a further possible embodiment of the recommendation engine according to the first aspect of the present invention, the second artificial intelligence module comprises a trained recurrent neural network.

In a further alternative embodiment of the recommendation engine according to the first aspect of the present invention, the second artificial intelligence module comprises a trained convolutional neural network.

Embodiments of the invention provide according to the second aspect a computer-implemented method for automatically providing recommendations for the completion of an engineering project, the method comprising the steps of:
- calculating by a first artificial intelligence module latent representations of a set of items, processing by a second artificial intelligence module the latent representations of the set of items to generate at least one sequence of complementary items required to complete the set of items and
- outputting via an interface the at least one sequence of complementary items as a recommendation to complete the engineering project.

In a possible embodiment of the computer-implemented method according to the second aspect of the present invention, one or more sequences of complementary items generated by the second artificial intelligence module are output on a screen of a user interface for selection of a next item from one of the sequences of complementary items or for selection of one or more items (not necessarily appearing one after the other) from one of the sequences of complementary items or for selection of a whole sequence of complementary items by the user.

In a further possible embodiment of the computer-implemented method according to the second aspect of the present invention, the selection of one of the complementary items or the selection of a whole sequence of complementary items by the user via the user interface automatically triggers an ordering command to order associated components for the engineering project.

This facilitates the provision of components required for the engineering project.

Embodiments of the invention further provide according to a further aspect a software tool.

Embodiments of the invention provide according to this aspect a software tool comprising a program code executable to perform the computer-implemented method according to the second aspect of the present invention.

Embodiments of the invention further provide according to a further aspect a platform.

Embodiments of the invention provide according to this aspect a platform comprising a recommendation engine according to the first aspect of the present invention.

The platform can comprise a cloud platform.

BRIEF DESCRIPTION

Some of the embodiments will be described in detail, with reference to the following figures, wherein like designations denote like members, wherein:

FIG. 3 shows a flowchart of a possible exemplary embodiment of a computer-implemented method for automatically providing recommendations for the completion of an engineering project according to a further aspect.

DETAILED DESCRIPTION

Figure 1:
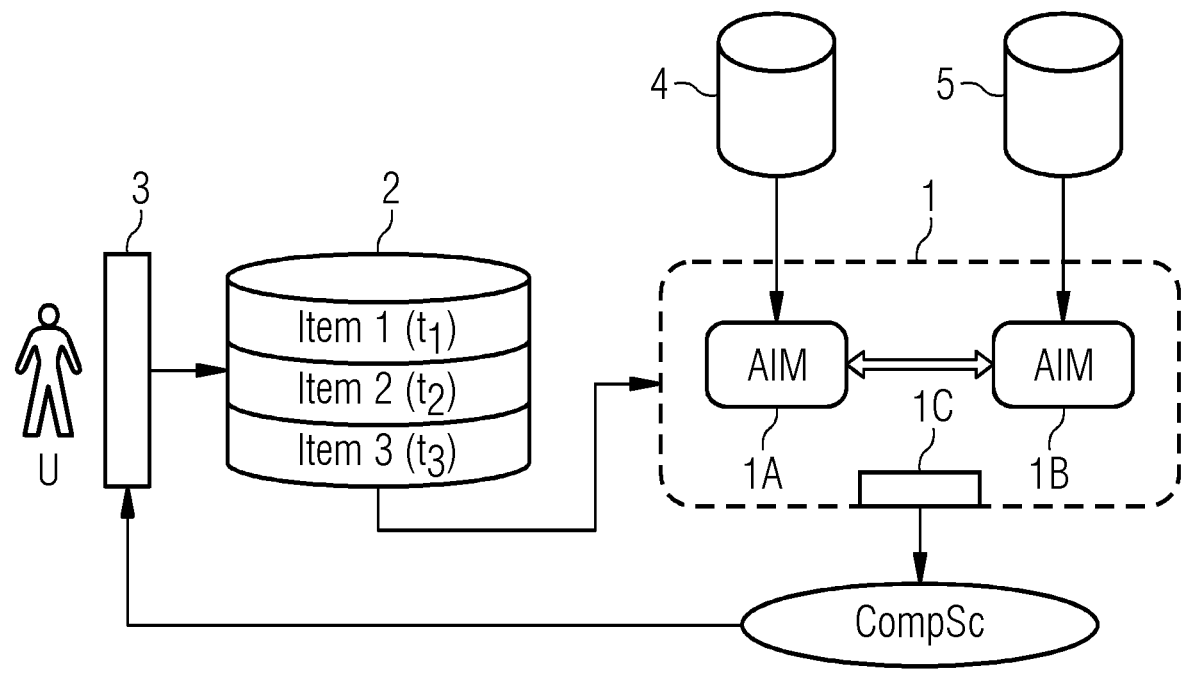
FIG. 1 shows a block diagram of a possible exemplary embodiment of a system including a recommendation engine according to the first aspect.

As can be seen from the block diagram of FIG. 1, a recommendation engine 1 according to the first aspect of embodiments of the present invention can form part of a system used to configure an engineering project such as an automated system. The automated system can comprise a plurality of hardware and/or software components. The recommendation engine 1 as illustrated in FIG. 1 comprises in the illustrated embodiment a first artificial intelligence module 1A and a second artificial intelligence module 1B. The first artificial intelligence module 1A is adapted to provide latent representations of a set of items. The second artificial intelligence module 1B is adapted to process the latent representations of the set of items provided by the first artificial intelligence module 1A to generate at least one sequence of complementary items. This sequence of complementary items is required to complement the set of items. To provide a complete sequence of items it can be output via an interface 1C of the recommendation engine 1 to complete the respective engineering project. In a possible embodiment, the items are selected from a set of available items wherein each available item does correspond to a hardware component and/or to a software component which can be used in the engineering project. In the embodiment illustrated in FIG. 1, the illustrated configuration system comprises a memory 2 connected to a user interface 3. The user interface 3 can be integrated in a user terminal or in a mobile user device. The set of selected items is stored at least temporarily in the memory 2 as shown in FIG. 1. The recommendation engine 1 has access to the memory 2 of the configuration system shown in FIG. 1. In the illustrated embodiment of FIG. 1, three selectable items $I_1$, $I_2$, $I_3$ are selected one after the other at times $t_1$, $t_2$, $t_3$ by the user U by the user interface 3. Accordingly, in this example, the set of selected items comprises a sequence of item I1 followed by item I2 followed by item I3. Each item I corresponds to a component of an engineering project. Each item I can comprise one or more item features. In a possible embodiment, the recommendation engine 1 has access to a database 4 storing item features of different items. Further, the recommendation engine 1 can have access to a further database 5 where a plurality of completed sequences of items are stored. Each item I corresponds to a hardware component such as a controller or a display panel. Each component can comprise one or more features or properties. For instance, a controller may comprise as technical features a supply voltage, a fail-safe compatibility or its power consumption. A display panel may comprise as technical features a supply voltage and the resolution of its screen.

The first artificial intelligence module 1A of the recommendation engine 1 can comprise in a possible embodiment a trained feature learning module adapted to calculate the latent representations of the set of items I stored in a selection basket of the memory 2 as shown in FIG. 1. Further, the second artificial intelligence module 1B of the recommendation engine 1 can comprise a trained sequential model adapted to calculate at least one sequence of complementary items output via the data interface 1C of the recommendation engine 1 to the user interface 3 of the user U. In a possible embodiment, the items I are selected by the user U via the user interface 3 having a screen adapted to output available items to the user. One or more sequences of complementary items generated by the second artificial intelligence module 1B can be displayed on the screen of the user interface 3 for selection of a next item from one of the sequences of complementary items or for selection of a whole sequence of complementary items by the user U. Further, it is possible that the user selects one or more items I which do not appear one after the other from one of the sequences of complementary items.

The first artificial intelligence module 1A as well as the second artificial intelligence module 1B can comprise artificial neural networks trained on technical features of components and trained on a plurality of sequences of previously selected items. In a possible embodiment, the first artificial intelligence module 1A can comprise a trained autoencoder. In an alternative embodiment, the first artificial intelligence module 1A comprises a tensor factorization model. In an embodiment, the second artificial intelligence module 1B comprises a trained recurrent neural network RNN. A recurrent neural network RNN is designed to exploit the temporal dependencies between the selected items within the engineering project. Further artificial neural networks can also be used for the second artificial intelligence module 1B. In a possible embodiment, the second artificial intelligence module 1B comprises a trained convolutional neural network.

The recommendation system as illustrated in FIG. 1 comprises a recommendation engine 1 which can be used for completing an engineering project that is partially configured by a user U. The recommendation engine 1 reduces the time required for completing the configuration of the engineering project. The recommendation engine 1 exploits the sequential nature of the configuration process of an engineering project. It can also exploit the complex relationships between the underlying components for generating project completion suggestions or recommendations. The information about the order in which components or items have been introduced into the recommendation system 1 comprise contextual information for completing the respective engineering project based on historical examples of previously configured engineering projects for which the same information is available. Introducing the technical information about the components can additionally ensure their compatibility. Further, the information can be used as the basis for recommendation when there is not enough historical data available. The recommendation engine 1 according to embodiments of the present invention can suggest to a user U the next item to be added to its engineering project. The recommendation engine 1 can also be used to provide automatic project completion, i.e., it can provide a sequence of items associated with components that remain to be added in order to fulfill all functional requirements of the engineering project. An automation mechanism can be installed for auto-completion of the partially configured engineering project.

Figure 2:
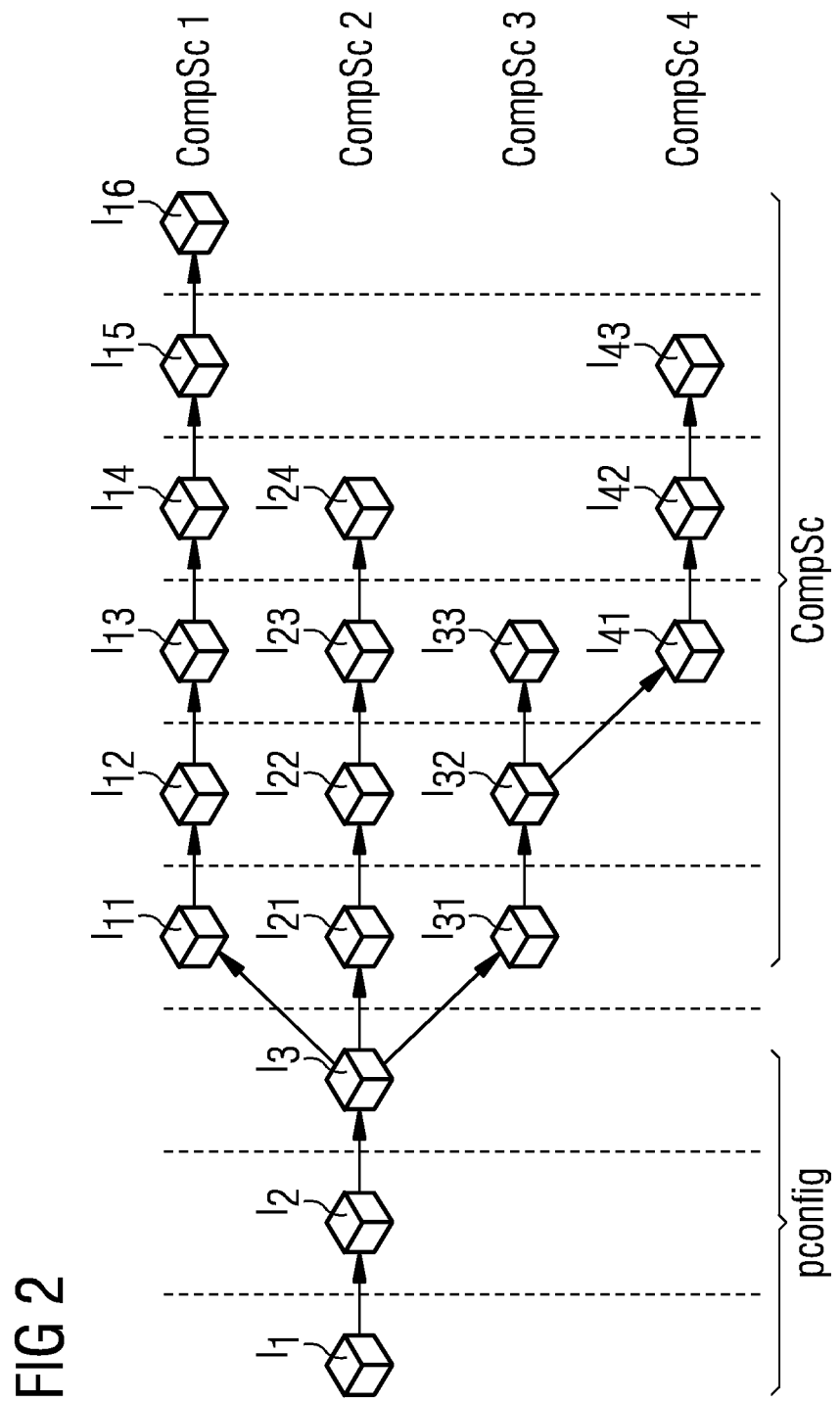
FIG. 2 shows schematically possible sequences of complementary items output as recommendations to a user by a recommendation engine as illustrated in FIG. 1.

FIG. 2 shows an example illustrating the operation of a recommendation engine 1 according to embodiments of the present invention. In the example, the user U has performed a partial configuration of an engineering project such as an automated system by selecting consecutively three items $I_1$, $I_2$, $I_3$ from the available items. Each item I corresponds to an associated component C usable in the engineering project. The partial configuration, i.e., the set of selected items $I_1$, $I_2$, $I_3$ can be stored in the memory 2 of the recommendation system illustrated in FIG. 1. The set of selected items $I_1$, $I_2$, $I_3$ is applied to the first artificial intelligence module 1A of the recommendation engine 1. The first artificial intelligence module 1A is adapted to provide latent representations of the set of selected items $I_1$, $I_2$, $I_3$. Latent representations for the selected items can be calculated automatically by the trained first artificial intelligence module 1A. The second artificial intelligence module 1B receives the calculated latent representations of the set of selected items $I_1$, $I_2$, $I_3$ provided by the first artificial intelligence module 1A. The second artificial intelligence module 1B can process the received latent representations of the set of selected items provided by the first artificial intelligence module 1A to calculate at least one sequence of complementary items required to complement the set of selected items $I_1$, $I_2$, $I_3$ to provide a complete sequence of items required to complete the whole engineering project. In the illustrated example of FIG. 2, the second artificial intelligence module 1B does generate different sequences of complementary items to complete the engineering project. These different sequences of complementary items form different completion scenarios CompSc which can be output as recommendations to the user U. A first completion scenario recommendation CompSc1 comprises in the illustrated example of FIG. 2 items $I_{11}$, $I_{12}$, $I_{13}$, $I_{14}$, $I_{15}$, $I_{16}$. Accordingly, the first sequence of complementary items comprises six items $I_{11}$ to $I_{16}$ which can be selected by the user U to provide a complete sequence of items required to complete the already partially configured (p config) engineering project. A second completion scenario CompSc2 comprises a sequence of complementary items including items $I_{21}$, $I_{22}$, $I_{23}$, $I_{24}$. A third completion scenario CompSc3 comprises in the illustrated example a sequence of complementary items $I_{31}$, $I_{32}$, $I_{33}$. Accordingly, after having selected the third item $I_3$ at time $t_3$ to provide a partial configuration (p config) of the engineering project, on request three different completion scenarios CompSc can be output via the user interface 3 to the user U as possible recommendations to complete the partially configured engineering project. The user U has now a choice either to select only a single item I of one of the recommended sequences of complementary items CompSc or to select one of the sequences of complementary items CompSc completely to finalize the whole engineering project. Different sequences of complementary items CompSc generated by the second artificial intelligence module 1B can be displayed on a screen of the user interface 3 for the selection by the user U. The user U may select using a selection command of a first type (e.g., clicking on item) a next single item I from one of the sequences of complementary items or may select with a selection command of a second type (e.g., clicking on CompSc) a whole sequence of complementary items. For example, the user U can select the first completion scenario CompSc1 as a whole to select automatically all remaining complementary items $I_{11}$ to item $I_{16}$ to complete the configuration of the engineering project. Alternatively, the user U may select completion scenario CompSc2 including four items $I_{21}$, $I_{22}$, $I_{23}$, $I_{24}$ or completion scenario CompSc3 including items $I_{31}$, $I_{32}$, $I_{33}$. Alternatively, the user U can select with an associated selection command only a single item to continue iteratively the selection process. The selection of a single item can e.g., be performed by clicking on the displayed item. For instance, the user U may select only item $I_{31}$ from the third displayed sequence of complementary items CompSc3 by clicking on item $I_{31}$. In the illustrated example of FIG. 2, the user U can then select in the next step item $I_{32}$ to get a further completion scenario CompSc4 displayed on the screen of the user interface 3 including items $I_{41}$, $I_{42}$, $I_{43}$. In a further step, the user U may then select the whole completed scenario CompSc4 including the three items $I_{41}$, $I_{42}$, $I_{43}$ to complete the engineering project or may select only the next single item of the third completion scenario CompSc3 (i.e., $I_{33}$) or the next single item of the new completion scenario, i.e. $I_{41}$ alone.

FIG. 3 shows a flowchart of a possible exemplary embodiment of a computer-implemented method according to the further aspect of the present invention. In the illustrated embodiment, the computer-implemented method is used for automatically providing recommendations for the completion of an engineering project, in particular an automated system comprising a plurality of hardware and/or software components. In the illustrated embodiment, the computer-implemented method comprises three main steps.

In a first step S1, latent representations of a set of items I are calculated by a first artificial intelligence module 1A.

In a further step S2, latent representations of the of items I are processed by a second artificial intelligence module 1B to generate at least one sequence of complementary items required to complete the sequence of selected items.

In a further step S3, the at least one sequence of complementary items are output as a recommendation to complete the engineering project. In the example as illustrated in FIG. 2, four sequences of complementary items forming different completion scenarios CompSc1 to CompSc4 can be output via a user interface 3 to a user U for further selection. In the illustrated example of FIG. 2, for the partial configuration at time $t_3$, the first three completion scenarios CompSc1 to CompSc3 are displayed for selection. The fourth completion scenario CompSc4 is displayed after the user U has selected items 131 and items 132 in the third completion scenario CompSc3.

The first artificial intelligence module 1A calculates for each selected item I a latent representation which comprises a vector v for the different features of the associated component. The recommendation engine 1 of the recommendation system according to embodiments of the present invention has the advantage that it is less reliant on manually defined rules. When provided with sufficiently rich contextual information and enough training examples, the recommendation system can discover substantially more complex dependencies among the components than those that can be specified by a domain expert. The performance of the recommendation system as illustrated in FIG. 1 comprising a recommendation engine 1 according to the first aspect of embodiments of the present invention does improve with time based on the collected training data.

A further advantage of the recommendation system according to embodiments of the present invention is that the system does not only provide recommendations to the user U explicitly but can also suggest to the user U on how to complete the full engineering project rather than just selecting the next item or component. The computer-implemented method as illustrated in the flowchart of FIG. 3 can be implemented in a software tool comprising a program code executable to perform the steps illustrated in FIG. 3.

The recommendation engine 1 as illustrated in the system of FIG. 1 can be implemented in a possible embodiment as a desktop solution. In this embodiment, the computer-implemented method can be executed by a processor of a user terminal. In an alternative embodiment, the recommendation engine 1 can also be implemented on a web server of a cloud platform connected via a data network to a plurality of different user terminals. In this embodiment, the computer-implemented method can be executed by one or more processors of a server of the cloud platform.

Further embodiments of the computer-implemented method according to the present invention are possible. For example, in the example of FIG. 2, a user U may also select an item which is not suggested by a completion scenario CompSc, i.e., a sequence of complementary items. The system can then check automatically whether the selected item does lead to a completion of the engineering project or not. If the selected item leads to the completion of the engineering project it can be accepted and on request, new completion scenarios CompSc can be calculated on the extended partial configuration including the added item. In a further exemplary embodiment, after having selected an item I suggested by a calculated completion scenario CompSc, the user U can also step back to the initial partial configuration, i.e., cancel the selected suggested complementary item. For instance, in the example of FIG. 2, after having selected item $I_{11}$ from the first completion scenario, the user U can delete the selection and fall back to the partial configuration including items $I_1$, $I_2$, $I_3$ and request a new calculation of completion scenarios and/or select another item such as item $I_{21}$ of the second completion scenario CompSc2. After the selection of a completion scenario CompSc, the user U may in a possible implementation acknowledge the selection to trigger an automatic ordering process of the associated components. For example, after having selected completion scenario CompSc2 including items $I_{21}$, $I_{22}$, $I_{23}$, $I_{24}$, the system can ask the user U whether he wants to finalize the engineering project and to trigger an automatic ordering of the physical components (hardware and/or software components) associated with the selected items $I_{21}$, $I_{22}$, $I_{23}$, $I_{24}$ of the selected completion scenario 2. Accordingly, the selecting of a next item or the selection of a whole sequence of complementary items by the user U via the user interface 3 can trigger in a possible implementation automatically an ordering command to order the associated components for completion of the engineering project.

The recommendation system according to embodiments of the present invention can employ the temporal dependencies between selected items associated with the components of the engineering project. After the user U has completed the set of items to finalize the project, the selected completion scenario can be used to update a content of the database 5 comprising the plurality of historical completed item sequences. Consequently, the performance of the recommendation system can improve over time with the increasing number of completed projects. The recommendation system can be used by one or more users U.

The recommendation engine 1 and method according to embodiments of the present invention can be used for a wide range of different application and use cases and are not restricted to the embodiments illustrated in FIGS. 1 and 2. The recommendation engine 1 and computer-implemented method according to embodiments of the present invention can be used for any complex system which require configuration of its functional components. The computer-implemented method can be implemented in software tools such as TIA Selection Tool, TIA Portal or NX Designer. Embodiments of invention provide a sequential recommendation system for completion of any kind of complex engineering projects.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A recommendation engine to automatically provide recommendations for the completion of an engineering project, the recommendation engine comprising:
a first artificial intelligence, AI, module configured to provide latent representations of a set of items selected corresponding to components usable for the engineering project, the latent representations encoding technical information about the components of the engineering project;
a second artificial intelligence, AI, module, comprising a trained sequential model and configured to process the latent representations of the set of items provided by the first artificial intelligence, AI, module to generate at least one sequence of complementary items required to complement the set of selected items to provide a complete sequence of items, the complete sequence of items forming a completion scenario of the engineering project, and output the generated at least one sequence of complementary items via an interface as a recommendation to complete the engineering project for selection of a respective sequence of complementary items of the at least one sequence of complementary items by a user;
wherein the recommendation engine is configured to automatically complete the engineering project with the selected respective sequence of complementary items.

2. The recommendation engine according to claim 1, wherein the set of items are selected from a set of available items corresponding to hardware components and/or software components usable for the engineering project.

3. The recommendation engine according to claim 2, wherein the set of selected items is stored at least temporarily in a memory connected to the recommendation engine.

4. The recommendation engine according to claim 2, wherein the set of items are selected by the user via a user interface having a screen configured to output available items to the user.

5. The recommendation engine according to claim 4, wherein one or more sequences of complementary items generated by the second artificial intelligence, AI, module are output on the screen of the user interface for selection of a next item from one of the sequences of complementary items or for selection of one or more items from one of the sequences of complementary items or for selection of a whole sequence of complementary items by the user.

6. The recommendation engine according to claim 1, wherein the first artificial intelligence, AI, module comprises a trained feature learning module configured to calculate the latent representations of the set of items.

7. The recommendation engine according to claim 1, wherein the first artificial intelligence, AI, module and the second artificial intelligence, AI, module comprise artificial neural networks trained on technical features of components and a plurality of sequences of previously selected items.

8. The recommendation engine according to claim 1, wherein the first artificial intelligence, AI, module comprises a trained autoencoder or a tensor factorization model.

9. The recommendation engine according to claim 1, wherein the second artificial intelligence, AI, module comprises a trained recurrent neural network or a trained convolutional neural network.

10. A computer-implemented method for automatically providing recommendations and completing an engineering project, the method comprising:
calculating by a first artificial intelligence, AI, module latent representations of a set of items selected corresponding to components usable for the engineering project, the latent representations encoding technical information about the components of the engineering project;
processing by a second artificial intelligence, AI, module using a trained sequential model the latent representations of the set of items to generate at least one sequence of complementary items required to complement the set of selected items to provide a complete sequence of items, the complete sequence of items forming a completion scenario of the engineering project;
outputting via an interface the generated at least one sequence of complementary items as a recommendation to complete the engineering project, for selection of a respective sequence of complementary items of the at least one sequence of complementary items by a user; and
automatically completing the engineering project with the selected respective sequence of complementary items.

11. The computer-implemented method according to claim 10, wherein one or more sequences of complementary items generated by the second artificial intelligence, AI, module are output on a screen of a user interface, as recommendations for selection of a next item from one of the output sequences of complementary items or for selection of one or more items from one of the sequences of complementary items or for selection of a whole sequence of complementary items by a user.

12. The computer-implemented method according to claim 11, wherein the selection of the next item or the selection of one or more items or the selection of the whole sequence of complementary items by the user via the user interface triggers automatically an ordering command to order associated components for the engineering project.

13. A software tool comprising a computer program product, comprising a computer readable hardware storage device having computer readable program code stored therein, said program code executable by a processor of a computer system to implement a method program code executable to perform the computer-implemented method according to claim 10.

14. A platform comprising a recommendation engine according to claim 1.

* * * * *